(12) United States Patent
Sant et al.

(10) Patent No.: US 11,919,775 B2
(45) Date of Patent: *Mar. 5, 2024

(54) CO 2 MINERALIZATION IN PRODUCED AND INDUSTRIAL EFFLUENT WATER BY PH-SWING CARBONATION

(71) Applicant: The Regents of the University of California, Oakland, CA (US)

(72) Inventors: Gaurav N. Sant, Los Angeles, CA (US); Hyukmin Kweon, Los Angeles, CA (US); Erika Callagon La Plante, Los Angeles, CA (US); Dante Adam Simonetti, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,194

(22) Filed: Dec. 15, 2021

(65) Prior Publication Data

US 2022/0212935 A1 Jul. 7, 2022

Related U.S. Application Data

(63) Continuation of application No. 16/627,238, filed as application No. PCT/US2018/040373 on Jun. 29, 2018, now Pat. No. 11,230,473.

(Continued)

(51) Int. Cl.
*C01B 32/60* (2017.01)
*B01D 53/14* (2006.01)
(Continued)

(52) U.S. Cl.
CPC .......... *C01B 32/60* (2017.08); *B01D 53/1475* (2013.01); *B01D 53/62* (2013.01);
(Continued)

(58) Field of Classification Search
None
See application file for complete search history.

(56) References Cited

U.S. PATENT DOCUMENTS

| 2,117,348 | A | 5/1938 | Muskat |
| 4,318,996 | A | 3/1982 | Magder |

(Continued)

FOREIGN PATENT DOCUMENTS

| JP | H05294693 A | 11/1993 |
| JP | H05330878 A | 12/1993 |

(Continued)

OTHER PUBLICATIONS

Buck., "Alkali Reactivity of Strained Quartz as a Constituent of Concrete Aggregate," Aug. 1983, 17 pages.

(Continued)

*Primary Examiner* — Daniel Berns
(74) *Attorney, Agent, or Firm* — Foley Hoag LLP; David P. Halstead; Alexander J. Chatterley

(57) ABSTRACT

Effluent water is combined with carbon dioxide sourced from a carbon dioxide-containing emission stream to produce a reaction solution. The pH of the reaction solution is controlled to induce precipitation of a carbonate salt from the reaction solution.

6 Claims, 2 Drawing Sheets

Related U.S. Application Data

(60) Provisional application No. 62/527,622, filed on Jun. 30, 2017.

(51) Int. Cl.
  B01D 53/62 (2006.01)
  B01D 53/78 (2006.01)
  C01F 11/18 (2006.01)
  C01D 7/00 (2006.01)
  E21B 43/20 (2006.01)
  F01K 17/04 (2006.01)

(52) U.S. Cl.
  CPC ............ B01D 53/78 (2013.01); C01F 11/183 (2013.01); C01F 11/188 (2013.01); B01D 2252/103 (2013.01); B01D 2252/60 (2013.01); B01D 2257/504 (2013.01); B01D 2258/0283 (2013.01); C01D 7/00 (2013.01); E21B 43/20 (2013.01); F01K 17/04 (2013.01)

(56) References Cited

U.S. PATENT DOCUMENTS

| | | | |
|---|---|---|---|
| 4,379,870 A | 4/1983 | Matsumoto | |
| 4,432,666 A | 2/1984 | Frey | |
| 4,452,635 A | 6/1984 | Noshi | |
| 4,828,620 A | 5/1989 | Mallow | |
| 5,435,846 A | 7/1995 | Tatematsu et al. | |
| 5,518,540 A | 5/1996 | Jones, Jr. | |
| 5,744,078 A | 4/1998 | Soroushian | |
| 5,798,328 A | 8/1998 | Kottwitz et al. | |
| 5,928,420 A | 7/1999 | Oates et al. | |
| 6,264,736 B1 | 7/2001 | Knopf | |
| 6,569,923 B1 | 5/2003 | Slagter | |
| 7,413,014 B2 | 8/2008 | Chatterji et al. | |
| 7,879,305 B2 | 2/2011 | Reddy et al. | |
| 8,021,477 B2 | 9/2011 | Brown et al. | |
| 8,088,292 B2 | 1/2012 | Neumann et al. | |
| 8,163,066 B2 | 4/2012 | Eisenberger | |
| 8,252,242 B2 | 8/2012 | Vandor | |
| 8,262,777 B2 | 9/2012 | Neumann et al. | |
| 8,333,944 B2 | 12/2012 | Constantz | |
| 8,383,072 B2 | 2/2013 | Smedley et al. | |
| 8,507,228 B2 | 8/2013 | Simpson et al. | |
| 8,852,319 B2 | 10/2014 | Wijmans et al. | |
| 8,864,876 B2 | 10/2014 | Neumann et al. | |
| 8,894,747 B2 | 11/2014 | Eisenberger et al. | |
| 9,061,237 B2 | 6/2015 | Eisenberger et al. | |
| 9,163,297 B2 | 10/2015 | Langley | |
| 9,205,371 B2 | 12/2015 | Cooper et al. | |
| 9,221,027 B2 | 12/2015 | Kuppler et al. | |
| 9,227,153 B2 | 1/2016 | Eisenberger | |
| 9,382,120 B2 | 7/2016 | Dakhil | |
| 9,382,157 B2 | 7/2016 | Guzzetta et al. | |
| 9,433,886 B2 | 9/2016 | Smedley et al. | |
| 9,440,189 B2 | 9/2016 | Mercier et al. | |
| 9,469,547 B2 | 10/2016 | Kniesburges | |
| 9,475,000 B2 | 10/2016 | Benyahia | |
| 9,555,365 B2 | 1/2017 | Eisenberger et al. | |
| 9,714,406 B2 | 7/2017 | Constantz et al. | |
| 9,786,940 B2 | 10/2017 | Langley | |
| 9,789,439 B2 | 10/2017 | Siller et al. | |
| 9,808,759 B2 | 11/2017 | Balfe et al. | |
| 9,861,931 B2 | 1/2018 | Kuopanportti et al. | |
| 10,017,739 B2 | 7/2018 | Tedder et al. | |
| 10,233,127 B2 | 3/2019 | Atakan | |
| 10,351,478 B2 | 7/2019 | Quinn et al. | |
| 10,392,305 B2 | 8/2019 | Wang et al. | |
| 10,668,443 B2 | 6/2020 | Kuppler et al. | |
| 10,781,140 B2 | 9/2020 | Patten et al. | |
| 10,968,142 B2 | 4/2021 | Sant et al. | |
| 11,040,898 B2 | 6/2021 | Sant et al. | |
| 11,230,473 B2 * | 1/2022 | Sant ...................... | B01D 53/78 |
| 11,339,094 B2 | 5/2022 | Sant et al. | |
| 11,384,029 B2 | 7/2022 | Sant et al. | |
| 11,746,049 B2 | 9/2023 | Sant et al. | |
| 2001/0023655 A1 | 9/2001 | Knopf | |
| 2002/0158018 A1 | 10/2002 | Abramowitz et al. | |
| 2002/0168473 A1 | 11/2002 | Ottersbach | |
| 2004/0077787 A1 | 4/2004 | Karande | |
| 2005/0238563 A1 | 10/2005 | Eighmy et al. | |
| 2006/0247450 A1 | 11/2006 | Wu et al. | |
| 2007/0186821 A1 | 8/2007 | Brown et al. | |
| 2008/0004449 A1 | 1/2008 | Yong et al. | |
| 2008/0156232 A1 | 7/2008 | Crudden | |
| 2008/0245274 A1 | 10/2008 | Ramme | |
| 2009/0081096 A1 | 3/2009 | Pellegrin | |
| 2009/0169452 A1 | 7/2009 | Constantz et al. | |
| 2009/0214408 A1 | 8/2009 | Blake et al. | |
| 2010/0083880 A1 | 4/2010 | Constantz et al. | |
| 2010/0251632 A1 | 10/2010 | Chen | |
| 2011/0006700 A1 | 1/2011 | Chen et al. | |
| 2011/0033239 A1 | 2/2011 | Constantz et al. | |
| 2011/0174156 A1 | 7/2011 | Saunders et al. | |
| 2011/0268633 A1 | 11/2011 | Zou | |
| 2011/0290155 A1 | 12/2011 | Vlasopoulos | |
| 2012/0082839 A1 | 4/2012 | Ha | |
| 2013/0008355 A1 | 1/2013 | Stokes | |
| 2013/0036945 A1 | 2/2013 | Constantz et al. | |
| 2013/0167756 A1 | 7/2013 | Chen et al. | |
| 2014/0097557 A1 | 4/2014 | Alhozaimy | |
| 2014/0197563 A1 | 7/2014 | Niven | |
| 2014/0356267 A1 | 12/2014 | Hunwick | |
| 2015/0225295 A1 | 8/2015 | McCandlish et al. | |
| 2015/0307400 A1 | 10/2015 | Devenney | |
| 2016/0082387 A1 | 3/2016 | Constantz et al. | |
| 2017/0182458 A1 | 6/2017 | Jiang et al. | |
| 2017/0226021 A1 | 8/2017 | Sant et al. | |
| 2018/0238157 A1 | 8/2018 | Fu et al. | |
| 2018/0341887 A1 | 11/2018 | Kislovskiy et al. | |
| 2019/0177220 A1 | 6/2019 | Sant et al. | |
| 2019/0367390 A1 | 12/2019 | Sant et al. | |
| 2020/0180964 A1 | 6/2020 | Sant et al. | |
| 2020/0299203 A1 | 9/2020 | Sant et al. | |
| 2021/0024364 A1 | 1/2021 | Sant et al. | |
| 2021/0188671 A1 | 6/2021 | Sant et al. | |
| 2021/0198157 A1 | 7/2021 | Sant et al. | |
| 2022/0064066 A1 | 3/2022 | Sant et al. | |
| 2022/0204401 A1 | 6/2022 | Sant et al. | |
| 2022/0212935 A1 | 7/2022 | Sant et al. | |
| 2022/0380265 A1 | 12/2022 | Sant et al. | |

FOREIGN PATENT DOCUMENTS

| | | |
|---|---|---|
| JP | 2002/145650 A | 5/2002 |
| WO | WO-2009/078430 A1 | 6/2009 |
| WO | WO-2010/006242 A1 | 1/2010 |
| WO | WO-2014/005227 A1 | 1/2014 |
| WO | WO-2014009802 A2 | 1/2014 |
| WO | WO-2015/112655 A2 | 7/2015 |
| WO | WO-2015/154174 A1 | 10/2015 |
| WO | WO-2016022522 A2 | 2/2016 |
| WO | WO-2016/061251 A1 | 4/2016 |
| WO | WO-2018/058139 A1 | 3/2018 |
| WO | WO-2018/081308 A1 | 5/2018 |
| WO | WO-2018/081310 A1 | 5/2018 |
| WO | WO-2019/006352 A1 | 1/2019 |
| WO | WO-2019/036386 A1 | 2/2019 |
| WO | WO-2019/036676 A1 | 2/2019 |

OTHER PUBLICATIONS

Communication Pursuant to Rules 70(2) and 70a(2) EPC on EP 18845904.4 dated Apr. 28, 2021.
Examination Report on IN 201927016758 dated Dec. 14, 2020 (5 pages).
Extended European Search Report on EP 18845904.4 dated Apr. 7, 2021.
Extended European Search Report on EP Application No. 17865241.8 dated May 15, 2020, 6 pages.

(56) References Cited

OTHER PUBLICATIONS

Falzone et al., "New insights into the mechanisms of carbon dioxide mineralization by portlandite", AIChE Journal, 67(5), p. e17160, 2021.
Final Office Action on U.S. Appl. No. 15/519,524 dated Oct. 14, 2020.
Final Office Action on U.S. Appl. No. 15/519,524 dated Nov. 21, 2019, 14 pages.
International Preliminary Report on Patentability for PCT/US2017/058359 dated May 9, 2019, 7 pages.
International Preliminary Report on Patentability on PCT/US2018/046557 dated Feb. 27, 2020.
International Search Report and Written Opinion for International Application No. PCT/US2015/055564 dated Jan. 22, 2016, 13 pages.
International Search Report and Written Opinion, issued in corresponding International Appln. No. PCT/US2018/046557, 12 pages (dated Dec. 17, 2018).
International Search Report and Written Opinion, issued in International Application No. PCT/US2017/058359, 8 pages (dated Jan. 9, 2018).
La Plante et al., "Controls on CO2 Mineralization Using Natural and Industrial Alkaline Solids under Ambient Conditions", ACS Sustainable Chem. Eng., 9(32), pp. 10727-10739, 2021.
Mehdipour et al., "How Microstructure and Pore Moisture Affect Strength Gain in Portlandite-Enriched Composites That Mineralize CO2", ACS Sustainable Chem. Eng., 7(15), pp. 13053-13061, 2019.
Mehdipour et al., "The role of gas flow distributions on CO2 mineralization within monolithic cemented composites: coupled CFD-factorial design approach", Reaction Chemistry & Engineering 6 (3), pp. 494-504, 2021.
Murnandari et al., "Effect of process parameters on the CaCO3 production in the single process for carbon capture and mineralization", Korean Journal of Chemical Engineering, Mar. 2017, vol. 34, Issue 3, pp. 935-941.
Non-Final Office Action on U.S. Appl. No. 15/519,524 dated Apr. 29, 2020, 12 pages.
Non-Final Office Action on U.S. Appl. No. 15/519,524 dated May 16, 2019, 13 pages.
Notice of Allowance on U.S. Appl. No. 15/519,524 dated Feb. 2, 2021.
Office Action on CN 201780076640.2 dated May 7, 2021.
Ramasubramanian et al., "Membrane processes for carbon capture from coal-fired power plant flue gas: A modeling and cost study," Journal of Membrane Science (2012) 421-422: 299-310.
Reddy et al., "Simultaneous capture and mineralization of coal combustion flue gas carbon dioxide (CO2)," Energy Procedia, 4, (2011), pp. 1574-1583.
Vance et al., "Direct Carbonation of Ca(OH)2 Using Liquid and Supercritical CO2: Implications for Carbon-Neutral Cementation", Ind. Eng. Chem. Res., 54(36), pp. 8908-8918, 2015.
Wei et al., "Clinkering-Free Cementation by Fly Ash Carbonation", Journal of CO2 Utilization, 23, pp. 117-127, 2018.
International Preliminary Report on Patentability issued in PCT/US2018/040373 dated Jan. 9, 2020, 6 pages.
International Search Report and Written Opinion issued in PCT Application No. PCT/US2018/040373 dated Sep. 20, 2018, 7 pages.
Li et al., "pH control using polymer-supported phosponic acids as reusable buffer agents," Green Chem., 2015, vol. 17, pp. 3771-3774.
Wang et al., "Integration of CO2 capture and storage based on pH-swing mineral carbonation using recyclable ammonium salts," Energy Procedia 4, 2011, 4930-4936.
U.S. Appl. No. 17/565,025, Pending.
U.S. Appl. No. 17/527,948, Pending.
U.S. Appl. No. 17/840,809, Pending.
Bustillos et al., "Implementation of Ion Exchange Processes for Carbon Dioxide Mineralization Using Industrial Waste Streams" Frontiers in Energy Research, vol. 8, Art 610392 (2020).
Bustillos et al., "Process simulations reveal the carbon dioxide removal potential of a process that mineralizes industrial waste streams via an ion-exchange based, regenerable pH swing" ACS Sustainable Chemistry, vol. 10, p. 6255-6264 (2022).
International Search Report and Written Opinion for Application No. PCT/US2023/024217 dated Oct. 9, 2023.
Vega-Vila et al. "Metal cations as inorganic structure-directing agents during the synthesis of phillipsite and tobermorite", Reaction Chemistry and Engineering, Mar. 1, 2023, 8, pp. 1176-1184.
U.S. Appl. No. 15/519,524, Granted.
U.S. Appl. No. 17/199,215, Pending.
U.S. Appl. No. 16/147,261, Granted.
U.S. Appl. No. 17/565,025, Granted.
U.S. Appl. No. 16/638,720, Granted.
U.S. Appl. No. 17/527,948, Allowed.
U.S. Appl. No. 16/627,238, Granted.
U.S. Appl. No. 16/821,478, Granted.
U.S. Appl. No. 17/840,809, Allowed.
U.S. Appl. No. 18/217,171, Pending.
U.S. Appl. No. 18/200,875, Pending.

\* cited by examiner

CO2 MINERALIZATION IN PRODUCED AND INDUSTRIAL EFFLUENT WATER BY PH-SWING CARBONATION

CROSS-REFERENCE TO RELATED APPLICATIONS

This application is a continuation of U.S. patent application Ser. No. 16/627,238, filed Dec. 27, 2019, and issued Jan. 25, 2022, which is a National Stage Entry of International Application No. PCT/US2018/040373, filed Jun. 29, 2018, which claims the benefit of and priority to U.S. Provisional Application No. 62/527,622, filed Jun. 30, 2017, the contents of which are incorporated herein by reference in their entirety.

STATEMENT OF GOVERNMENT SUPPORT

This invention was made with government support under DE-FE0029825, and DE-FE0031705 awarded by the U.S. Department of Energy. The government has certain rights in the invention.

TECHNICAL FIELD

This disclosure generally relates to an aqueous carbonation route for carbon dioxide ($CO_2$) sequestration.

BACKGROUND

Produced effluent water from oil and gas extraction operations, industrial (aqueous) effluents containing dissolved minerals, desalination brine, sea water, and other effluent water compose large waste streams based on volume. It is desired to treat these waste streams to derive value, while employing management costs and handling practices that are both cost effective and environmentally sustainable. The treated water may also find potential uses in irrigation, rangeland restoration, and animal consumption, among others.

Produced effluent water generally represents a waste product in the petroleum industry. If an oil or gas operator is to utilize a low-cost disposal option, the treated water has to meet the specifications set by regulators. Specifications can be related to oil and grease discharge, chemical content (e.g., total dissolved solids, TDS), physical characteristics (e.g., temperature), and biological content (e.g., coliforms per liter). Extraction of salts or impurities is often the most important part of water treatment systems, as TDS in produced water can range from about 2,000 ppm to about 150,000 ppm. In addition, choices on the water treatment method depends on the water's TDS content. Oil and gas operators have attempted evaporation, distillation, membrane filtration, electric separation, and chemical treatments to remove salts. However, further improvements in the treatment in effluent water remain desired, specially to derive added-value.

It is against this background that a need arose to develop the embodiments described herein.

SUMMARY

In some embodiments, a method includes: combining effluent water with carbon dioxide sourced from a carbon dioxide-containing emission stream to produce a reaction solution; and controlling the pH of the reaction solution to induce precipitation of a carbonate salt from the reaction solution.

In some embodiments, a method includes: combining effluent water with carbon dioxide sourced from a carbon dioxide-containing emission stream to produce a reaction solution; and inducing precipitation of a carbonate salt from the reaction solution in the presence of a pH buffer agent.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Embodiments of this disclosure are directed to a direct aqueous carbonation route for $CO_2$ sequestration using calcium- and magnesium-rich solutions such as produced effluent water derived from oil and gas extraction operations, industrial mineral-containing effluent water, desalination brine, sea water, and other effluent water. In some embodiments, direct carbonation takes advantage of increased carbonation reaction rates that occur in the liquid (aqueous) phase.

Figure 1:
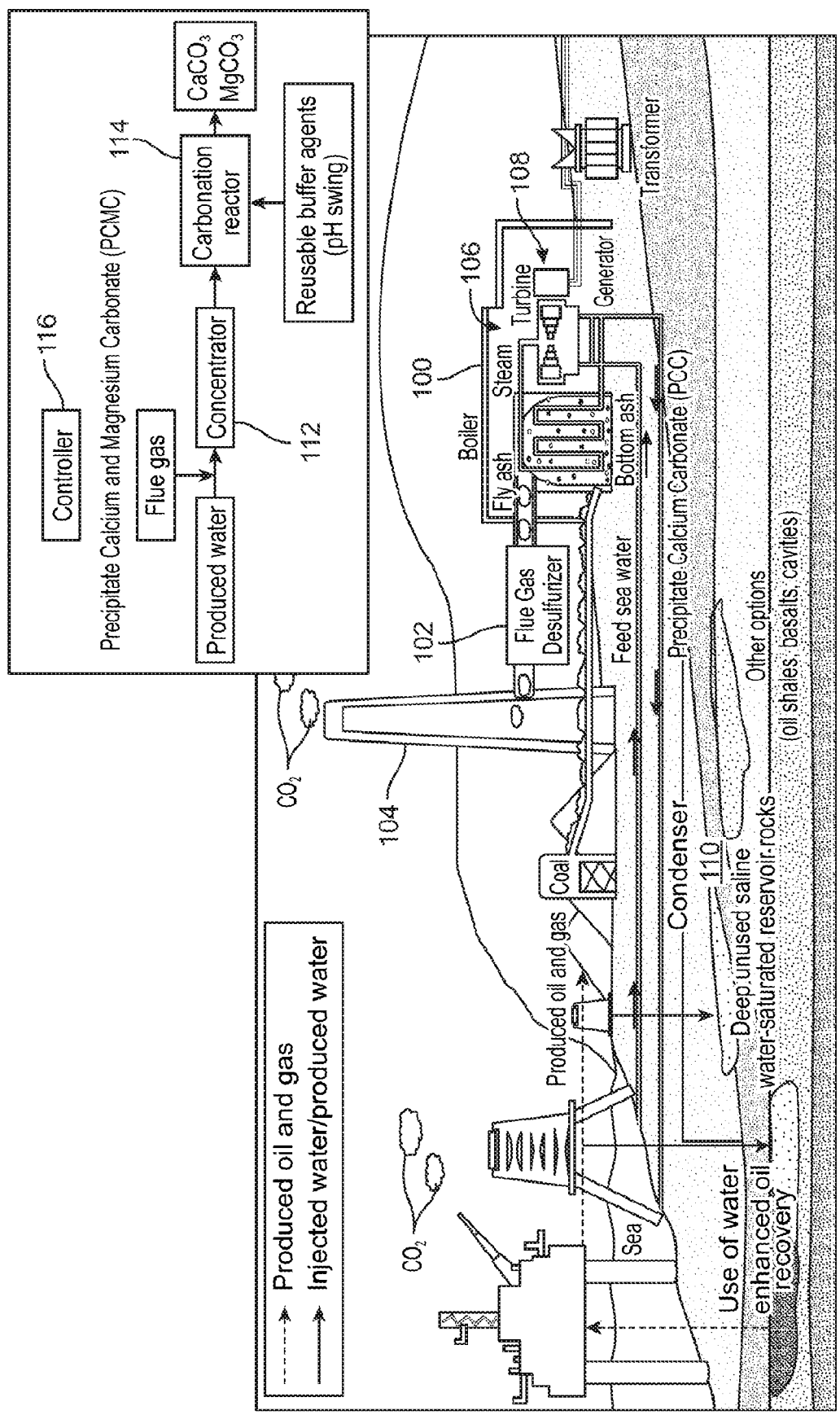
FIG. 1. Direct aqueous carbonation using produced effluent water and flue gas.

FIG. 1 shows an example implementation of a direct aqueous carbonation method using produced effluent water and flue gas from a coal-fired power plant as may be especially suited to co-located coal power plant and enhanced oil recovery (EOR) sites. As shown in FIG. 1, coal is fed into a boiler 100, where combustion takes place to produce fly ash, bottom ash, and flue gas containing $CO_2$. The flue gas is fed into a flue gas desulfurizer 102 to remove sulfur dioxide ($SO_2$) and is then released into the atmosphere through a flue gas stack 104. Water extracted from the ocean or from riverine or other sources is fed into the boiler 100 and transported through conduits within the boiler 100. Heat from the combustion of coal converts the feed sea water into steam, which drives a turbine 106 connected to the boiler 100, producing electricity through a generator 108. After driving the turbine 106, the exhausted steam, which may be at least partially condensed, is converted into a liquid form using a condenser 110.

In the direct aqueous carbonation method, flue gas obtained after desulfurization is extracted and reacted with effluent water (e.g., as secured from near-shore, or on-shore hydrocarbon extraction operations) or water that may be exhausted from the turbine 106 to yield a carbonation reaction that can precipitate carbonate salts, such as in the form of relevant polymorphs of calcium carbonate and magnesium carbonate and related compounds. The gas reactant can encompass both dilute and concentrated flue gas streams with $CO_2$ concentrations ranging from about 1% $CO_2$ to near pure/substantially 100% $CO_2$ (v/v).

In addition to flue gas from coal-fired power plants, other $CO_2$-containing emission streams can be used as a $CO_2$ source. Thus, in addition to implementation in the context of power plants fired by coal and natural gas, $CO_2$ emissions from chemical and petrochemical plants, methane processing operations, and so forth, can be used.

As shown in the inset of FIG. 1, flue gas is combined with effluent water in a concentrator 112, wherein the concentrations of one or both of the reactants can be increased or otherwise adjusted, and the resulting reaction solution is fed into a carbonation reactor 114 connected to the concentrator 112. The concentrator 112 can include, for example, a capacitive concentrator (e.g., including a pair of electrodes connected to an electrical source) to increase concentrations of calcium and magnesium ions, a mixer/compressor to increase $CO_2$ concentration, or both. A carbonation reaction takes place within the reactor 114 to precipitate carbonate salts, such as in the form of calcium carbonate and magnesium carbonate, which can either be deposited underground or serve as a valuable product for other uses, for example, as fine and coarse mineral aggregates for use in concrete. A pH buffer agent can be fed into the reactor 114 and introduced into the reaction solution to adjust or control its pH to promote the carbonation reaction. In place of, or in combination with, the use of a pH buffer agent, pH control can be performed by mixing solute-rich (e.g., in terms of Ca and Mg) and solute-poor (e.g., in terms of Ca and Mg following depletion of these species due to the precipitation of carbonate salts) liquid streams until the desired pH level is achieved. Subsequent to the carbonation reaction, the resulting treated water, which would have reduced amount of TDS, can either be discharged into the ocean, deposited underground or be subjected to further treatment. Alternatively, or in conjunction with the method described above, the treated water can be leveraged further for other uses, such as for oil recovery operations as shown in FIG. 1, or other uses including irrigation, rangeland restoration, animal consumption, and agriculture. A controller 116 (e.g., including a processor and an associated memory storing processor-executable instructions) can be included to direct operation of various components shown in FIG. 1.

Figure 2:
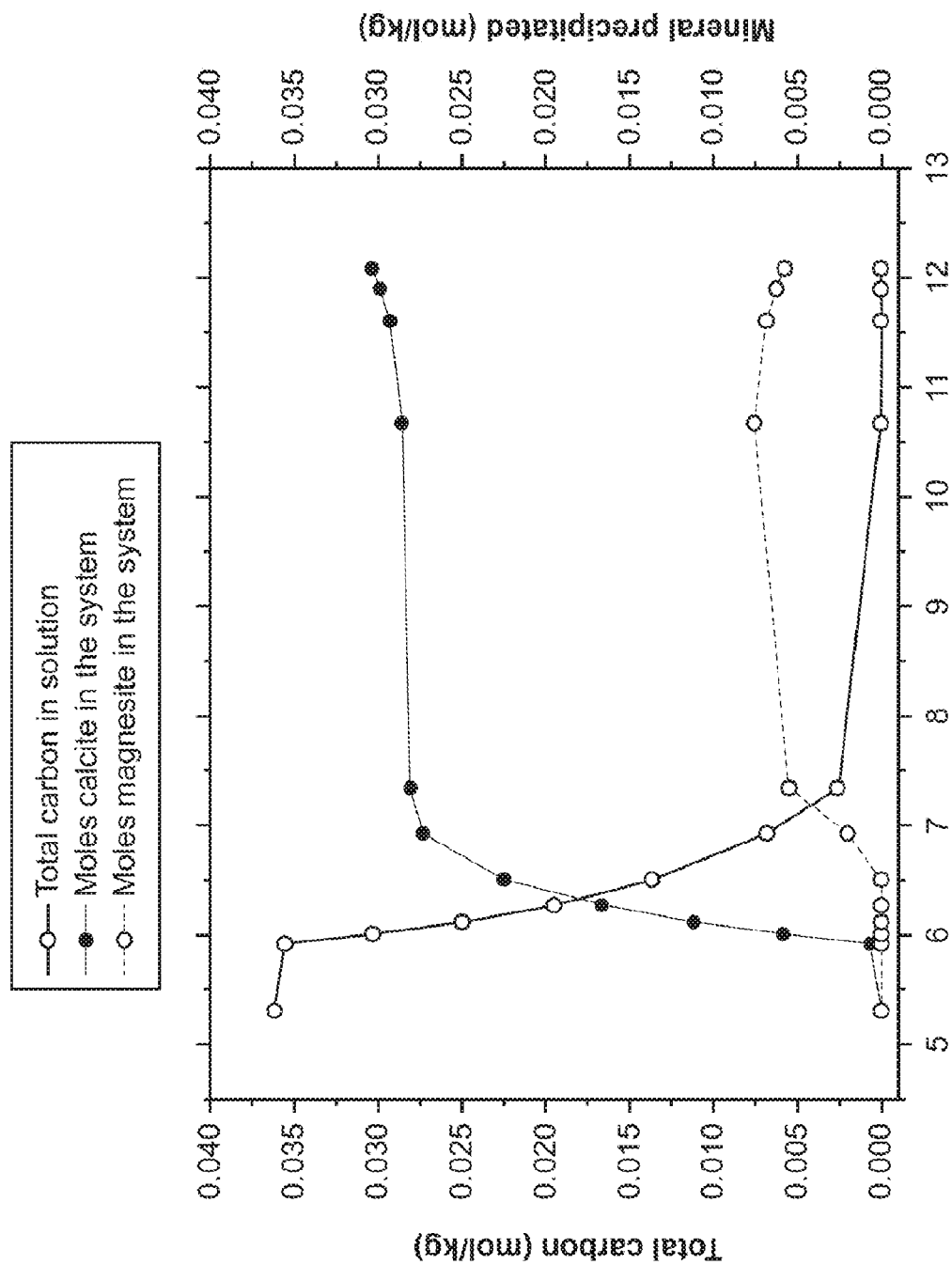
FIG. 2. Representative carbon (C), calcite ($CaCO_3$), and magnesite ($MgCO_3$) concentrations as a function of pH in an effluent water solution that is saturated with $CO_2$. As the pH is elevated, such as by provision of a reusable, regenerable buffer agent (base) or by adding additional effluent, the total dissolved C in solution depletes as calcite (or another carbonate salt) precipitates. This example calculation is for a closed system in which total dissolved C is depleted as calcite precipitates, and for an initial Ca concentration of about 1400 ppm. If the solution is allowed to maintain a fixed saturation with $CO_2$ (e.g., in a practical sense, by continually exposing the solution with $CO_2$) as calcite precipitates, the solubility with respect to the carbonates (e.g., $MgCO_3$, $(Ca,Mg)CO_3$ phases, and other carbonates such as $BaCO_3$ and $SrCO_3$) can increase.

The pH of effluent water can vary between about 5.5 and about 9, although typical produced effluent water features a pH between about 6.5 and about 7.8 and is rich in dissolved calcium and magnesium. When $CO_2$ (from a flue gas) is injected at or near atmospheric conditions, the pH can be suppressed down to about 5.2, thereby enforcing increases in calcium (and magnesium) solubility as shown in FIG. 2. By exploiting the pH-induced solubility shift, in a pH range between about 6 and about 8, dissolved ions, such as calcium and magnesium, can be precipitated as carbonate salts.

A more acidic solution decreases the driving force for subsequent carbonate salt precipitation. Therefore, direct carbonation is enhanced in a solution that has a higher pH. To reduce the amount and cost of chemicals for promoting carbonation reactions, the pH of an acidic solution is controlled using a recyclable pH buffer agent. Examples of recyclable pH buffer agents include ammonium salts, such as ammonium bicarbonate ($NH_4HCO_3$). An ammonium salt can be collected by evaporation and subsequent heating to regenerate ammonia. However, this process can specify an undesirable amount of energy and produce non-environmentally friendly substances. Another example of such recyclable pH buffer agent can include heterogeneous buffer agents, such as polymer-supported phosphonic acid or other polymer-supported (basic) buffer agents which can be conveniently sourced in the form of polymer beads that offer high surface area. The use of a polymer buffer agent can be explained by an ion exchange reaction. Ion exchange of the polymer buffer agent may be described by the following reaction scheme where protons, $H^+$ are removed from solution by exchanging alkaline cations with the buffer agent (where: R is a suitable functional group that is associated with one or more types of exchangeable cations including alkaline metals for basic buffering, or protons if the buffer is to maintain acidic conditions; see example of base buffer below):

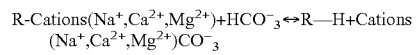

$$R\text{-Cations}(Na^+,Ca^{2+},Mg^{2+})+HCO_3^- \leftrightarrow R\text{—}H+\text{Cations}(Na^+,Ca^{2+},Mg^{2+})CO_3^-$$

Therefore, the resulting pH depends on the concentration of positively charged species in the buffer agent, and on the concentration of relevant counterions in the produced water. One possible functional group that is relevant in a reusable buffer agent is carboxylate ($RCOO^-$). Advantageously, heterogeneous buffer agents are often less hazardous, solvent-free, and are environmentally friendly. Following a desired level of direct (aqueous) carbonation, the heterogeneous buffer agent, in particulate form, can be removed from a reaction solution by filtration and then reused effectively. Additional examples of heterogeneous buffer agents include clays supporting ion exchange reactions, such as zeolites including cations that can be exchanged for protons.

Advantages of some embodiments of the direct aqueous carbonation route for $CO_2$ sequestration include the following. Unlike $CO_2$ geo-sequestration, indirect carbonation, and other sequestration methods, the direct aqueous carbonation route avoids the criterion for: 1) stripping $CO_2$ from flue gas using a scrubbing media; 2) compression of $CO_2$ for long-distance transport by pipeline; and 3) large amounts of acid and base for allowing mineral dissolution and carbonation. Importantly, unlike amine stripper-based $CO_2$ processing, the direct carbonation route proposed herein imposes no criterion for steam generated by the power plant thereby eliminating any "parasitic" energy losses. Furthermore, by exploiting the temperature dependent solubility and precipitation kinetics of carbonate salts, waste heat derived from flue gases can be re-used to improve carbonation process efficiencies. Since carbonate solubility is both pH and temperature dependent, both of these parameters can be optimized to improve the process throughput.

The following are example embodiments of this disclosure.

In a first aspect according to some embodiments, a method includes: combining effluent water with carbon dioxide sourced from a carbon dioxide-containing emission stream to produce a reaction solution; and controlling the pH of the reaction solution to induce precipitation of a carbonate salt from the reaction solution.

In some embodiments of the first aspect, controlling the pH includes increasing the pH of the reaction solution. In some embodiments, controlling the pH includes adjusting the pH of the reaction solution to about 6 or greater, about 6.5 or greater, about 7 or greater, about 7.5 or greater, or about 8 or greater, and up to about 9 or greater.

In some embodiments of the first aspect, controlling the pH includes introducing a pH buffer agent in the reaction solution. In some embodiments, the pH buffer agent is a heterogeneous buffer agent. In some embodiments, the heterogeneous buffer agent is a polymer-supported buffer agent. In some embodiments, the heterogeneous buffer agent is a clay to support ion exchange reaction. In some embodiments, the method further includes, subsequent to the precipitation of the carbonate salt, recovering the heterogeneous buffer agent by filtration.

In some embodiments of the first aspect, the carbonate salt includes at least one of calcium carbonate or magnesium carbonate, or another carbonate (e.g., barium carbonate) or other related solids.

In some embodiments of the first aspect, the carbon dioxide-containing emission stream is a flue gas stream.

In a second aspect according to some embodiments, a method includes: combining effluent water with carbon dioxide sourced from a carbon dioxide-containing emission stream to produce a reaction solution; and inducing precipitation of a carbonate salt from the reaction solution in the presence of a pH buffer agent.

In some embodiments of the second aspect, inducing the precipitation of the carbonate salt includes controlling the pH of the reaction solution, using the pH buffer agent. In some embodiments, inducing the precipitation of the carbonate salt includes adjusting the pH of the reaction solution to about 6 or greater, about 6.5 or greater, about 7 or greater, about 7.5 or greater, or about 8 or greater, and up to about 9 or greater.

In some embodiments of the second aspect, the pH buffer agent is a heterogeneous buffer agent. In some embodiments, the heterogeneous buffer agent is a polymer-supported buffer agent. In some embodiments, the heterogeneous buffer agent is a clay to support ion exchange reaction. In some embodiments, the method further includes, subsequent to the precipitation of the carbonate salt, recovering the heterogeneous buffer agent by filtration.

In some embodiments of the second aspect, the carbonate salt includes at least one of calcium carbonate or magnesium carbonate, or another carbonate (e.g., barium carbonate) or other related solids.

In some embodiments of the second aspect, the carbon dioxide-containing emission stream is a flue gas stream.

In a third aspect according to some embodiments, an apparatus includes: a concentrator to produce a reaction solution from effluent water and carbon dioxide sourced from a carbon dioxide-containing emission stream; and a carbonation reactor connected to the concentrator to receive the reaction solution and induce precipitation of a carbonate salt from the reaction solution. In some embodiments, the carbonation reactor is configured to control the pH of the reaction solution. In some embodiments, the carbonation reactor is configured to introduce a pH buffer agent in the reaction solution.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method comprising:
    combining effluent water with carbon dioxide sourced from a carbon dioxide-containing emission stream to produce a reaction solution; and
    controlling the pH of the reaction solution with a regenerable, heterogeneous pH buffer agent to induce precipitation of a carbonate salt from the reaction solution;
    wherein the carbon dioxide-containing emission stream is a flue gas stream; and
    the regenerable heterogeneous pH buffer agent is a polymer-supported buffer agent or a zeolite that supports cation exchange reactions.

2. The method of claim 1, wherein controlling the pH includes increasing the pH of the reaction solution.

3. The method of claim 1, wherein controlling the pH includes adjusting the pH of the reaction solution to 6 or greater.

4. The method of claim 1, wherein controlling the pH includes adjusting the pH of the reaction solution to 6.5 or greater.

5. The method of claim 1, further comprising, subsequent to the precipitation of the carbonate salt, recovering the regenerable, heterogeneous pH buffer agent by filtration.

6. The method of claim 1, wherein the flue gas stream comprises from about 1% $CO_2$ to about 100% $CO_2$.

* * * * *